Dec. 2, 1969  G. GLUCHOWICZ  3,481,081
DEVICE IN INTERNAL CYLINDRICAL GRINDING MACHINES
Filed May 23, 1967  2 Sheets-Sheet 1
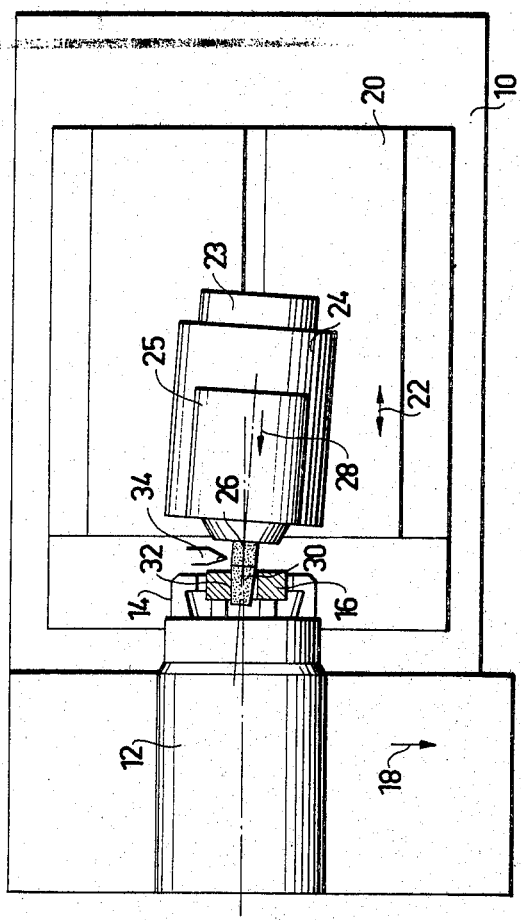
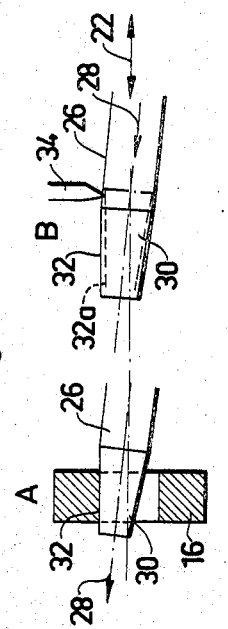
INVENTOR
Gerszon Gluchowicz

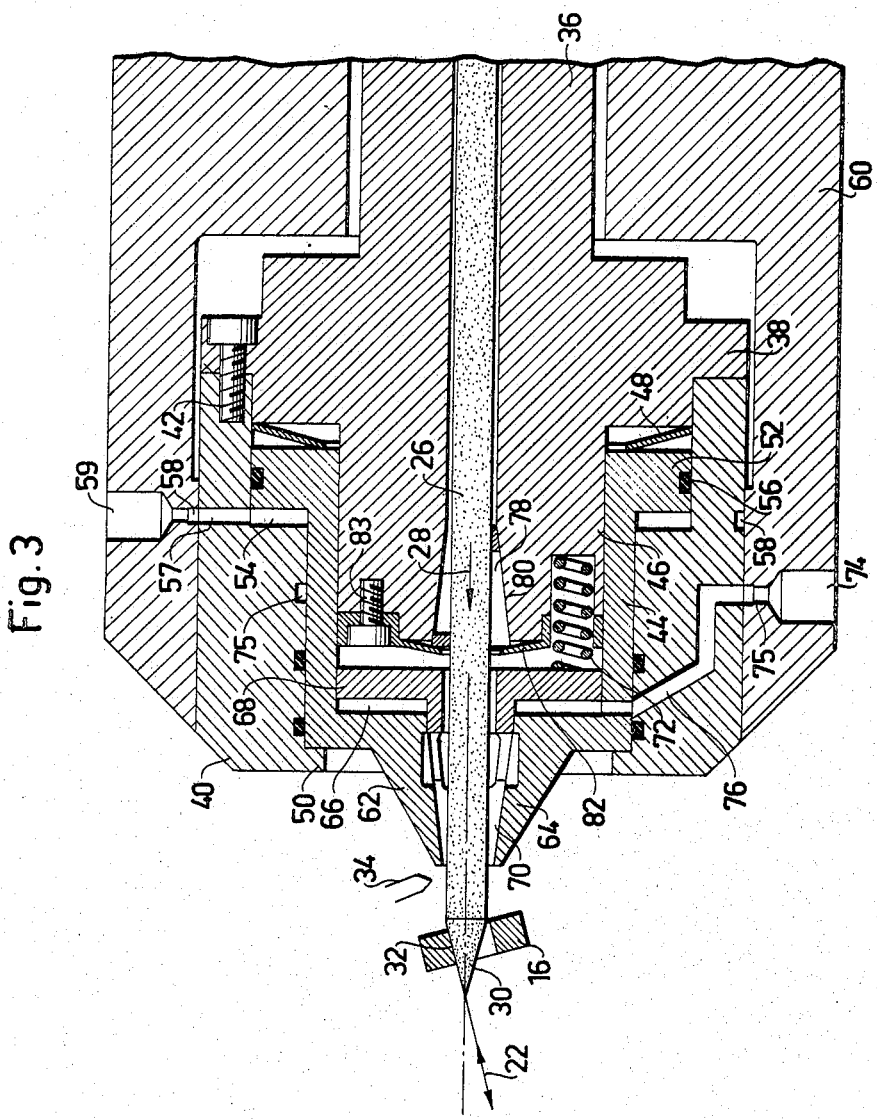

United States Patent Office 3,481,081
Patented Dec. 2, 1969

3,481,081
DEVICE IN INTERNAL CYLINDRICAL GRINDING MACHINES
Gerszon Gluchowicz, Djursholm, Sweden, assignor to Ulvsunda Verkstader Aktiebolag, Johannesfredsvagen, Bromma, Sweden, a Swedish corporation
Filed May 23, 1967, Ser. No. 640,710
Claims priority, application Sweden, June 3, 1966, 7,686/66
Int. Cl. B24b 5/14, 5/06
U.S. Cl. 51—50                     4 Claims

ABSTRACT OF THE DISCLOSURE

This machine uses a cylindrical grinding member which is dressed to conical shape at its forward, operative end. The work is supported for rotation about the axis of its bore; and the grinding member is mounted for angular adjustment so that the generatrix of its conical surface along the line of contact of said surface with the internal surface of the workpiece is parallel to the axis of said bore. For dressing the grinding member is advanced axially; and after dressing the grinding wheel is advanced in the direction of the axis of the workpiece. Because of its basic cylindrical shape, the wheel can be dressed many times as compared with conventional wheels.

This invention relates to internal grinding machines.

More particularly this invention relates to an arrangement for cylindrical internal grinding machines of the type comprising both a chuck supporting the work piece and a grinding wheel supported by a spindle in a holder mounted rotatably. In known machines of this type a relative reciprocative axial movement is effected between said rotatable elements, and whilst the grinding wheel is in the bore of the work piece the periphery of the grinding wheel is brought into contact with and grinds the inner surface or bore wall of the work piece by a transverse movement. This transverse movement which is known as the feed movement, continues until the inner surface of the work piece has been ground to the desired measurement. It is also necessary to reshape the grinding wheel at certain intervals with a tool, such as a diamond, partially to restore the cutting ability of the grinding wheel and partially to true the periphery of the grinding wheel to the correct geometrical form. Before the wheel is reshaped the grinding wheel is moved a predetermined distance in a transverse direction in the direction of the diamond, such a displacement being usually known as compensation.

The grinding operations are continued until the wheel has worn out when it is replaced by a new one, whilst the transverse carriage effecting the feeding movement is returned to the zero position from which the new feeding movement is begun with the replaced wheel. When the work pieces have smaller inner diameters, a grinding wheel of small diameter is provided and then the number of ground work pieces per wheel becomes relatively small. Therefore, it becomes necessary to a corresponding degree to stop the machine frequently in order to replace the wheel. The manual operations which are simultaneously required causes interferences, especially with automatic machines, and result in addition a substantial time loss which decreases the utility factor of the machine.

One main object of the present invention is to eliminate these disadvantages by providing longer intervals between each grinding wheel replacement, thereby rendering possible these intervals to be extended over an entire work shift or at least a substantial period thereof.

According to one main feature of the invention the axis of rotation of the grinding wheel spindle is mounted at an inclined angle to the axis of rotation of the work piece, and the grinding wheel and the work piece are displaceable relatively to one another in the direction of the axis of rotation of the spindle, for the purpose of effecting the aforementioned radial component, at least to the degree that the compensation is necessary.

A further object of the invention is to provide means allowing the use of a wheel having a constant diameter so as to be sufficient for grinding a substantially greater number of work pieces than hitherto.

Still another object of the invention is to provide an internal grinding machine of the type in consideration in which a direct measurement of the work bore is rendered possible, by maintaining a space in the bore of the work piece to allow access from the rear for a gauge.

Further objects and advantages of the invention will become apparent from the following description considered in connection with the accompanying drawings which form part of this specification, and of which:

FIG. 1 is a diagrammatic plan view of an internal grinding machine devised according to the invention.

FIGS. 2A and B are diagrammatic illustrations of the operation of the machine shown in FIG. 1.

FIG. 3 is a longitudinal sectional view of a holding device for the grinding wheel according to another embodiment of the invention.

Referring to the drawings and in particular FIG. 1, reference numeral 10 indicates a machine frame in which is fitted a tail-stock 12 in which a chuck 14 is rotatably mounted, the chuck supporting a work piece 16. In the embodiment shown the tail-stock 12 is devised as a cross-slide and thus makes possible a transverse feed movement in the direction of the arrow 18 in a manner known per se. A table 20 is displaceable in the frame 10 in a forward and reverse path in the longitudinal direction of the frame as indicated by the double arrow 22, and supports a slide lower portion 23 which is adjustable at an inclined angle to the aforementioned path.

The upper portion 24 of the slide, having a holder 25 positioned thereon for the grinding wheel 26, is displaceably mounted on the lower portion 23 of the slide and can be fed forward stepwise for a desired distance in a way known per se. However, depending upon the angular adjustment of the lower portion 23 on table 20, the directional movement of the slide portion 24 is inclined in the direction of the arrow 28 to the direction 22 of the reciprocal movement of the table. The angular inclination of the arrow 28 to the direction of movement of the table may be of a magnitude from 4–10 to 20°. Thus the rotatable grinding wheel 26 has its axis of rotation as represented by the arrow 28 inclined at an angle to the longitudinal axis of the frame i.e. the direction of movement of the table 20 represented by the double arrow 22. As a result of this inclined position the dressed grinding wheel obtains a truncated conical end portion 30, which with a generatrix 32 makes contact with the cylindrical inner surface of the work piece 16, said generatrix coinciding with the direction of movement 22 of the table 20. Reference numeral 34 indicates a diamond or dressing tool which in the illustrated embodiment is positioned on the tail-stock 12 and therefore accompanies the tail-stock in the transverse feed movement of the latter. Further, the axis of rotation of the work piece 16 is parallel with the direction of movement 22 of the table 20. The cone angle of the portion 30 of the grinding wheel 26 is such, as above stated, that its generatrix 32 in the grinding zone is always parallel to the cylindrical inner surface of the work piece 16 that is to be ground. At the position shown in FIG. 1 the grinding is effected between the components, the table 20 reciprocating in the direction of the double arrow 22 and simultaneously the tail-stock 12 being fed transversely in the direction of the arrow 18.

Subsequent to a first grinding operation of a work piece 16 the grinding wheel 26 is withdrawn from the work piece 16 by a movement of the table 20 in the direction of the double arrow 22. This implies that the grinding wheel 26 has been moved from position A to position B in FIG. 2. In addition, the grinding wheel is fed forward by a displacement of the slide 24 in the direction of the arrow 28 through a pre-determined distance corresponding to the amount of "compensation" necessary for the reshaping desired to be effected by means of the diamond 34. In this position the reshaping of the grinding wheel is effected, the frusto-conical portion 30 being cut away so that the generatrix 32 assumes the new position 32a, i.e. the truncated cone is rebuilt at a pre-determinable distance to the right, as shown in an exaggerated scale in FIG. 2. The generatrix 32a of the grinding wheel assumes again a precise position in the machine so that when the wheel is reintroduced into the work piece 16 by the table 20 in the direction of movement 22, the grinding can be continued in the normal manner during transverse feeding of the work piece until the final desired inner diameter measure has been achieved.

The grinding wheel 26 is of greater length than its frusto-conical portion 30 which signifies that the wheel can be successively fed forward in the direction of the arrow 28 during the reshaping by means of the diamond 34. It is possible to give the grinding wheel 26 a rod-like shape so that reshaping can be carried out a great number of times before the wheel has worn out and thus must be replaced.

That portion of the truncated conical grinding wheel surface 30 which makes contact with the work piece during the grinding operation is always of the same diameter. It is possible, as a result of the reshapings, for the conical surface to extend out to a point, whereby it is necessary to calculate the smallest diameter to which the grinding may be carried out, because the peripheral speed is dependent upon the diameter and therefore the diameter should not be allowed to be reduced below a specific value.

The embodiment illustrated in FIG. 3 is distinguishable from the previously described embodiment in that the compensation is effected through the grinding wheel 26 being displaceable in relation to the spindle 36 which supports said wheel. The wheel 26 is given an appreciable length so as to resemble a cylindrical rod. The rotatable spindle 36 is provided with a flange 38 to which a sleeve like ring 40 is rigidly secured by means of screws 42. A piston 44 is mounted between the sleeve ring 40 and a forward cylindrical portion 46 of the spindle. The piston is held by a spring member such as a spring washer 48 in contact with a mating portion 50 formed on the sleeve ring 40 and is provided with a flange 52 positioned in a chamber 54 in the spindle, the piston being sealed by an O-ring 56 against a cylindrical wall in the sleeve ring. A pressure medium, such as compressed air is supplied to the chamber 54 by a radial channel 57 in the rotatable sleeve ring 40 and a peripheral tube 58 together with a radial channel 59 in a stationary casing 60. By supplying compressed air to the chamber 54 the piston 44 is displaced in a direction to compress the spring 48, and disengage the piston from the mating portion 50.

The piston 44 is provided with a forward, central portion 62 which has a conical inner surface 64. A chamber 66 is formed between the piston 44 and the cylindrical portion 46 of the spindle, a piston 68 being axially displaceable within the chamber 66. The piston has slotted tongues 70 or the like members which are pressed into the cone 64 by spring-force exerted by spring members 72 which are positioned in the forward end portion 46 in angularly spaced relation the tongues 70 engaging the grinding rod 26 and retaining it in an axial position. It is possible to connect the chamber 66 with a pressure medium source, e.g. compressed air, through the channels 74, 75 and 76, causing the interior piston 68 to be displaced backwards against the action of the spring members 72 and the tongues 70 to release their engagement about the rod 26.

Further, an axially slotted conical sleeve 78 is located in a conical recess 80 in the forward portion 46 of the spindle 36. The sleeve 78 is retained and pressed into the cone 80 by means of a spring washer 82 which is secured to portion 46 by screws 83, the sleeve 78 thereby engaging and retaining securely the grinding rod 26 in spindle 36. The grinding rod is thus during the grinding operation locked against movement in both axial directions by means of the members 70 and 78.

The device illustrated in FIG. 3 operates in the following manner. It may be assumed that the conical portion 30 of the grinding rod 26 is in its operative position within the work piece and that the said portion executes an oscillatory motion (by means of a table 20 as shown in FIG. 1) in relation to the rotating work piece 16 in the direction of the double arrow 22. By performing a transverse feed motion at right angles to the direction of the double arrow 22 a grinding operation is effected on the inner surface of the work piece, during which contact is established between the grinding rod and the work piece along the generatrix 32 which is parallel to the longitudinal direction of the arrow 22.

Subsequent to a first grinding operation the holder 60 and the grinding rod 26 are drawn back (by the table 20) in a direction indicated by the double arrow 22. Compressed air is then introduced into the chamber 66 which causes the piston 58 to be moved to the right against the action of the spring members 72, which are compressed, the tongues 70 thereupon releasing their engagement with the grinding rod 26. However, the rod 26 continues to be retained in position by the slotted conical sleeve 78. At this point compressed air is supplied to the chamber 54 causing the piston 44 also to be displaced to the right. Subsequently the chamber 66 is exhausted which causes the tongues 70 of the piston 68 to re-engage about the grinding rod 26 but at a position further to the right of the previous position. Thereafter the excess air pressure also having been exhausted from the chamber 54, the spring member 48 will overcome the resistance from the sleeve 78 and will drive the grinding rod 26 a specific distance out from the spindle, which distance corresponds to the compensation required after the reshaping operation. The conical grinding rod portion 30 can now be reshaped by means of the diamond 34, which causes a displacement of the cone-surface on the rod 26 a small distance to the right in FIG. 3. Thereafter the workpiece can be reintroduced into the work piece 16 and the final grinding operation can be carried out by feeding the work piece 16 transversely in relation to the grinding rod.

That graduation through which the grinding rod 26 is fed every time it is advanced relatively to the spindle 36 is determined so that it corresponds to the desired compensation and so that the generatrix 32 assumes a precise position in the machine. The graduated stepwise forward feeding of the grinding rod 26 in relation to the spindle 36 is carried out automatically and in a very short time.

In the embodiment represented in FIG. 3 it would also be possible to effect a radial feed by displacing the grinding rod or wheel and the spindle 36 in the direction of their axis of rotation according to the arrow 28. This displacement can be effected by means of a slide 24 of the type illustrated in FIG. 1, the slide being displaceable in relation to the table 20 at an inclined angle defined by the arrow 28.

Whenever the phrase "relative movement" or a similar phrase between two components is used in the preceding description or the appended claims it includes that either one of the components can be stationary whilst the other is displaceable.

While several embodiments of the invention have been shown and described it is to be understood that this is for

What I claim is:

1. In an internal grinding machine for grinding the cylindrical bore of a workpiece, and having means for rotatably supporting a grinding member and a workpiece, means for moving said supporting means relative to one another to move said grinding member and workpiece relative to one another in the direction of the axis of said bore and in a transverse direction, and means for inclining the axis of said grinding member to the axis of said bore, the improvement wherein the grinding member is an elongate cylinder having a conical operating surface on its front end; and means is provided for advancing said grinding member axially for dressing it, said grinding member being adjusted after dressing to bring its conical operating surface into contact with the bore of the workpiece along a line parallel to the axis of the workpiece, and said grinding member and workpiece being moved relative to one another in said transverse direction to compensate for the amount of stock dressed off said member and to govern the amount of stock ground off the workpiece.

2. An internal grinding machine as defined in claim 1, wherein the means for supporting said grinding member is a rotary spindle and said spindle is advanced axially for dressing the grinding member and for compensating for wear of the grinding member.

3. An internal grinding machine as defined in claim 1 wherein the means for supporting said grinding member comprises a rotatable spindle having an axial bore, said grinding member is mounted coaxially in said bore, resilient jaws are reciprocably mounted on said spindle releasably to grip said grinding member to cause it to rotate with said spindle, and said advancing means includes means operative first to release said jaws, thereby to release said grinding member, then to move said jaws axially along said grinding member unidirectionally for a predetermined distance, then to reengage said jaws with said grinding member, and then to advance said jaws until the conical end of said grinding member extends out of said spindle.

4. An internal grinding machine as defined in claim 3, having a first fluid pressure operated means operatively connected to said jaws and movable in opposite directions to retract and advance, respectively, said jaws relatively to said spindle, a second set of gripping jaws mounted in said spindle and axially displaced from the first-named jaws, and means constantly urging said second set of jaws forwardly to advance said grinding member, second fluid pressure operated means for preventing said advance, and means for controlling the operations of the two fluid pressure operated means whereby the first-named jaws are first released and then moved rearwardly along said grinding member, then are reengaged with said grinding member at a point displaced axially therealong rearwardly from their first point of engagement with said grinding member, and said second fluid pressure operated means is deactivated so that said second set of jaws is actuated to advance said grinding member axially forwardly in said spindle.

References Cited

UNITED STATES PATENTS 2,442,683  6/1948  Green _____ 51—60
2,383,094  8/1945  Walder _____ 297—43 X JAMES L. JONES, JR., Primary Examiner U.S. Cl. X.R.

51—103, 206